(12) United States Patent
Sugihara et al.

(10) Patent No.: US 8,710,177 B2
(45) Date of Patent: Apr. 29, 2014

(54) CONDUCTIVE POLYMER AND A SOLID ELECTROLYTIC CAPACITOR USING THE SAME AS A SOLID ELECTROLYTE

(75) Inventors: Ryosuke Sugihara, Osaka (JP); Kazuto Fujihara, Osaka (JP); Takashi Ono, Osaka (JP)

(73) Assignee: Tayca Corporation, Osaka-shi (JP)

( * ) Notice: Subject to any disclaimer, the term of this patent is extended or adjusted under 35 U.S.C. 154(b) by 51 days.

(21) Appl. No.: 13/259,701

(22) PCT Filed: Nov. 16, 2010

(86) PCT No.: PCT/JP2010/070325
§ 371 (c)(1),
(2), (4) Date: Sep. 23, 2011

(87) PCT Pub. No.: WO2011/068026
PCT Pub. Date: Jun. 9, 2011

(65) Prior Publication Data
US 2012/0018662 A1   Jan. 26, 2012

(30) Foreign Application Priority Data

Dec. 4, 2009 (JP) .................. 2009-275979
Dec. 15, 2009 (JP) .................. 2009-283621

(51) Int. Cl.
*C08G 75/00* (2006.01)
(52) U.S. Cl.
USPC ............................ 528/377; 528/378; 528/380
(58) Field of Classification Search
USPC .......................... 528/377, 378, 380
See application file for complete search history.

(56) References Cited

U.S. PATENT DOCUMENTS

| 4,910,645 A * | 3/1990 | Jonas et al. ............... 361/525 |
| 2003/0139505 A1 | 7/2003 | Reuter et al. |
| 2003/0149171 A1 | 8/2003 | Groenendaal et al. |
| 2005/0009986 A1 | 1/2005 | Groenendaal et al. |
| 2005/0013094 A1 | 1/2005 | Reuter et al. |

FOREIGN PATENT DOCUMENTS

| JP | 3040113 B2 | 5/2000 |
| JP | 2003-160647 A | 6/2003 |
| JP | 2003-261573 A | 9/2003 |
| JP | 2004-525946 A | 8/2004 |
| JP | 2004-265927 A | 9/2004 |
| JP | 2005-039276 A | 2/2005 |
| JP | 2005-513219 A | 5/2005 |
| JP | 2008-063585 A | 3/2008 |
| JP | 2010-278360 A | 12/2010 |

OTHER PUBLICATIONS

International Search Report of PCT/JP2010/070325, mailing date Mar. 1, 2011 Previously presented.

* cited by examiner

*Primary Examiner* — Shane Fang

(57) ABSTRACT

There is provided a conductive polymer having a high electrical conductivity and an excellent heat resistance. Using it as a solid electrolyte, there is provided a solid electrolyte capacitor having a low ESR and a large capacitance with good reliability under a hot condition. A monomer mixture of 2,3-dihydro-thieno[3,4-b][1,4]dioxin and 2-alkyl-2,3-dihydro-thieno[3,4-b][1,4]dioxin at a mixture ratio of 0.05:1 to 1:0.1 by the molar ratio is polymerized in the presence of an organic sulfonic acid, and the organic sulfonic acid is included as a dopant. As the 2-alkyl-2,3-dihydro-thieno[3,4-b][1,4]dioxin, the alkyl portion can be methyl, ethyl, propyl or butyl.

10 Claims, No Drawings

CONDUCTIVE POLYMER AND A SOLID ELECTROLYTIC CAPACITOR USING THE SAME AS A SOLID ELECTROLYTE

FIELD OF INVENTION

The present invention relates to a conductive polymer and a solid electrolytic capacitor using the conductive polymer as a solid electrolyte.

BACKGROUND TECHNOLOGY

A conductive polymer has a high electrical conductivity so that it have been used as a solid electrolyte for a solid electrolytic capacitor, such as tantalum solid electrolytic capacitor, aluminum solid electrolytic capacitor, and niobium solid electrolytic capacitor.

As a conductive polymer in such an application, one obtained by chemical oxidative polymerization or electrolytic oxidation polymerization of thiophene or the derivative thereof has been used.

As a dopant for performing a chemical oxidative polymerization of thiophene or the derivative thereof, an organic sulfonic [sulphonic] acid is mainly used. Among other things, it is said that an aromatic sulfonic acid is preferred. As an oxidant, a transition metal is used, and among other things, it is said that a ferric salt is preferred. Usually, a ferric salt of an aromatic sulfonic acid is used as an oxidant and dopant agent for performing a chemical oxidative polymerization of thiophene or the derivative thereof.

As a thiophene or the derivative thereof, 3,4-ethylenedioxythiophene has been often used since thereby obtained conductive polymer has a good balance of the electrical conductivity and the heat resistance so as to increase the utility of the polymer (see Patent Publications Nos. 1 and 2).

However, the engineering innovation of a solid electrolytic capacitor in using a conductive polymer as a solid electrolyte has been rapid, and further improvement in the properties is demanded, and therefore, the conductive polymer is also demanded to be improved in its properties.

Then, in order to increase the electrical conductivity, it was proposed to use 3,4-alkylenedioxy thiophene in which 3,4-ethylenedioxythiophene has been modified with a substituted alkyl group (see Patent Publication No. 3). However, in case where 3,4-alkylenedioxy thiophene is used, the heat resistance is significantly decreased, and when using it in a solid electrolyte of a solid electrolytic capacitor, the reliability of the solid electrolytic capacitor under a hot condition becomes decreased while the ESR (equivalent series resistance) becomes high (i.e., deteriorated), resulting in the lack of practicability.

Prior Art References (Patent Publications) are: Japanese Laid-open Patent Publication No. 2003-160,647 (Patent Publication No. 1); Japanese Laid-open Patent Publication No. 2004-265,927 (Patent Publication No. 2); and Japanese laid-open PCT published publication No. 2004-525,946 (Patent Publication No. 3).

SUMMARY OF THE INVENTION

Objectives to Solve by the Invention

In consideration of the circumstances as explained above, the present application provides a conductive polymer having an increased electrical conductivity and an excellent heat resistance, and by using it as a solid electrolyte, the present invention provides a solid electrolytic capacitor having a low ESR and a large capacitance as well as a good reliability under a hot condition.

Means to Solve the Objectives

The present invention provides a conductive polymer in which a mixed monomer of 2,3-dihydro-thieno[3,4-b][1,4]dioxin(2,3-Dihydro-thieno[3,4-b][1,4]dioxine) and 2-alkyl-2,3-dihydro-thieno[3,4-b][1,4]dioxin(2-Alkyl-2,3-dihydro-thieno[3,4-b][1,4]dioxine) at a molar ratio of 0.05:1 to 1:0.1 is polymerized in the presence of an organic sulfonic acid, and the organic sulfonic acid is included as a dopant. The invention was accomplished to find that the conductive polymer has a high electrical conductivity and an excellent heat resistance, and by using it as a solid electrolyte, thereby obtained solid electrolytic capacitor has a low ESR, a large capacitance and a good reliability under a hot condition.

Effects of the Invention

The conductive polymer of the present invention has a high electrical conductivity and an excellent heat resistance. Also, the solid electrolytic capacitor using the conductive polymer as a solid electrolyte has a low ESR, a large capacitance and a good reliability under a hot condition.

EMBODIMENT TO CARRY OUT THE INVENTION

In preparing the conductive polymer of the present invention, the monomer mixture as a raw material is made by mixing 2,3-dihydro-thieno[3,4-b][1,4]dioxin with 2-alkyl-2,3-dihydro-thieno[3,4-b][1,4]dioxin at a mixture ratio of 0.05:1 to 1:0.1 by the molar ratio. Each of the monomers in the monomer mixture is represented by the general formula (1) below.

(1)

In the formula, R represents hydrogen or an alkyl group.

When R in the general formula (1) is hydrogen, such a compound is, under the IUPAC name, 2,3-dihydro-thieno[3,4-b][1,4]dioxin. Rather than the IUPAC name, this compound is often called by the general name, "ethylenedioxythiophene." In this specification, "2,3-dihydro-thieno[3,4-b][1,4]dioxin" is referred as "ethylenedioxythiophene." Note that "ethylenedioxythiophene" is the same as "3,4-ethylenedioxythiophene" discussed before. When R in the general formula (1) is an alkyl group, it can be the alkyl group having a carbon number of 1 to 4, that is, methyl group, ethyl group, propyl group or butyl group. In detail, when the R in the general formula (1) is methyl group, such a compound is "2-methyl-2,3-dihydro-thieno[3,4-b][1,4]dioxin(2-methyl-2,3-dihydro-thieno[3,4-b][1,4]dioxine)" under the IUPAC name, which is hereinafter referred to as "methylated ethylenedioxythiophene" for the purpose of simplification. When the R in the general formula (1) is ethyl group, such a compound is "2-ethyl-2,3-dihydro-thieno[3,4-b][1,4]dioxin(2-ethyl-2,3-dihydro-thieno[3,4-b][1,4]dioxine)" under the IUPAC name, which is hereinafter referred to as "ethylated ethylenedioxythiophene" for the purpose of simplification. When the R in the general formula (1) is propyl group, such a compound is "2-propyl-2,3-dihydro-thieno[3,4-b][1,4]dioxin(2-propyl-2,3-dihydro-thieno[3,4-b][1,4]dioxine)" under the IUPAC name, which is hereinafter referred to as "propylated ethylenedioxythiophene" for the purpose of simplification. When the R in the general formula (1) is butyl group, such a compound "2-butyl-2,3-dihydro-thieno[3,4-b][1,4]dioxin(2-butyl-2,3-dihydro-thieno[3,4-b][1,4]dioxine)" under the IUPAC name, which is hereinafter referred to as "butylated ethylenedioxythiophene" for the purpose of simplification. Also, "2-alkyl-2,3-dihydro-thieno[3,4-b][1,4]dioxin" is referred to as "alkylated ethylenedioxythiophene" for the purpose of simplification. Among the alkylated ethylenedioxythiophenes, the methylated ethylenedioxythiophene, the ethylated ethylenedioxythiophene, the propylated ethylenedioxythiophene and the butylated ethylenedioxythiophene are preferable, and in particular, the ethylated ethylenedioxythiophene and the propylated ethylenedioxythiophene are preferable.

Also, the reason why the mixture ratio of the monomer mixture of ethylenedioxythiophene (i.e., 2,3-dihydro-thieno[3,4-b][1,4]dioxin) and the alkylated ethylenedioxythiophene (i.e., 2-alkyl-2,3-dihydro-thieno[3,4-b][1,4]dioxin) is 0.05:1 to 1:0.1 by the mixture ratio is because such a definition can make a conductive polymer having an electrical conductivity higher than the conductive polymer obtained from a monomer of ethylenedioxythiophene alone; and make the heat resistance of the conductive polymer more excellent than the conductive polymer made from a monomer of an alkylated ethylenedioxythiophene alone. When the ratio of the ethylenedioxythiophene in the monomer mixture is lower than the range specified above, the heat resistance can be deteriorated, and when the ratio of the ethylenedioxythiophene is higher than that specified above, a high electrical conductivity as desired cannot be obtained.

In the present invention, the mixture ratio of the monomer mixture of ethylenedioxythiophene and the alkylated ethylenedioxythiophene can be 0.1:1 to 1:0.1, and in particular, 0.2:1 to 1:0.2, and more in particular, 0.3:1 to 1:0.3.

In particular, when the alkylated ethylenedioxythiophene to be mixed with ethylenedioxythiophene is the ethylated ethylenedioxythiophene or the propylated ethylenedioxythiophene, thereby obtained conductive polymer can improve its electrical conductivity almost equivalent to a high level of the electrical conductivity due to the derivation from the ethylated ethylenedioxythiophene or the propylated ethylenedioxythiophene. Also, the heat resistance of the conductive polymer can be significantly improved differently from the low level of the heat resistance due to the ethylated ethylenedioxythiophene or the propylated ethylenedioxythiophene, so as to be close to the excellent heat resistance derived from the ethylenedioxythiophene. Therefore, a conductive polymer having a good balance of the electrical conductivity and the heat resistance can be obtained. In other words, a conductive polymer obtained by polymerization of a monomer mixture of an alkylated ethylenedioxythiophene such as the ethylated ethylenedioxythiophene or the propylated ethylenedioxythiophene mixed with ethylenedioxythiophene has, as shown in Examples Nos. 1-7 later, a high electrical conductivity equivalent to the conductive polymer obtained by polymerizing a single monomer of the ethylated ethylenedioxythiophene or the propylated ethylenedioxythiophene alone, while it has an excellent heat resistance equivalent to the conductive polymer obtained by polymerizing a single monomer of ethylenedioxythiophene alone.

While the organic sulfonic acid to be a dopant in the conductive polymer is not particularly limited, aromatic sulfonic acids such as benzene sulfonic acid or the derivative thereof, naphthalene sulfonic acid or the derivative thereof, and anthraquinone sulfonic acid or the derivative thereof; and polymer sulfonic acids such as polystyrene sulfonic acid, sulfonated polyester and phenol sulfonic acid novolak resin.

The benzene sulfonic acid or the derivative of the benzene sulfonic acid can include toluene sulfonic acid, ethylbenzene sulfonic acid, propylbenzene sulfonic acid, butylbenzene sulfonic acid, dodecylbenzene sulfonic acid, methoxybenzene sulfonic acid, ethoxybenzene sulfonic acid, propoxybenzene sulfonic acid, butoxybenzene sulfonic acid, phenol sulfonic acid, cresol sulfonic acid, and benzene disulfonic acid. The naphthalene sulfonic acid or the derivative of the naphthalene sulfonic acid can include naphthalene disulfonic acid, naphthalene trisulfonic acid, methylnaphthalene sulfonic acid, ethylnaphthalene sulfonic acid, propylnaphthalene sulfonic acid, and butylnaphthalene sulfonic acid. The anthraquinone sulfonic acid or the derivative of the anthraquinone sulfonic acid can include anthraquinone disulfonic acid, and anthraquinone trisulfonic acid. Among these aromatic sulfonic acids, toluenesulfonic acid, methoxybenzene sulfonic acid, phenol sulfonic acid, naphthalene sulfonic acid, and naphthalene trisulfonic acid can be particularly used.

As an oxidation polymerization to synthesize the conductive polymer, either of chemical oxidative polymerization or electrolytic oxidation polymerization can be used. The oxidation polymerization can be performed in water, or in an aqueous solution of water and a water-miscible solvent, or in an alcohol solution. When the polymerization of the conductive polymer is for the purpose of preparing a solid electrolytic capacitor, the monomer is liquid so that the monomer can be used as it is, or in order to smoothly promote the polymerization reaction, the monomer can be diluted with an organic solvent such as methanol, ethanol, propanol, butanol, acetone, and acetonitrile to provide an organic solvent solution for polymerization. In such a case, the oxidant and dopant agent can be preferably used in a liquid state of the organic solvent. Hereinafter, the explanation is made as to the general preparation of a conductive polymer, and if necessary, the explanation is referred to the preparation of a conductive polymer for the purpose of production of a solid electrolytic capacitor.

As a water-miscible solvent to provide the aqueous solution, a solvent such as methanol, ethanol, propanol, acetone, and acetonitrile can be used. The mixture ratio of the water-miscible solvent and water can be 50% by mass or less in the total of the aqueous solution.

The oxidation polymerization in water or the aqueous solution is preferable when the organic sulfonic acid to become a dopant is used as an organic salt such as an imidazole salt or when a persulfate such as ammonium persulfate is used as an oxidant. When a transition metal such as iron is used as an oxidant and an organic sulfonic acid is used as a state of a metal salt, the oxidation polymerization can be preferably performed in an alcohol solvent. As such an alcohol solvent, a solvent such as methanol, ethanol, propanol and butanol, and an alcohol mixed with acetone or acetonitrile can be used.

As an oxidant in the chemical oxidative polymerization, a transition metal or a persulfate can be used. The transition metal can include iron, copper, cerium, chromium, manganese, ruthenium, and zinc. Among them, iron is preferred. The persulfate can include ammonium persulfate, sodium persulfate, potassium persulfate, calcium persulfate, and barium persulfate. Among them, ammonium persulfate can be preferably used.

In case where an aromatic sulfonic acid is used as a dopant, iron can be used as an oxidant and iron aromatic sulfonate can be used as an oxidant and dopant agent. As such, the polymerization reaction can promptly proceed, resulting in a preferable condition due to a high productivity and a low cost production.

As to the iron aromatic sulfonate as the oxidant and dopant agent, the molar ratio of the aromatic sulfonic acid and iron can be 2.00:1 to 2.95:1. When the molar ratio of the aromatic sulfonic acid with respect to iron is lower than the ratio specified above, the stability of the iron aromatic sulfonate in the solution can be deteriorated. When the molar ratio of the aromatic sulfonic acid with respect to iron is higher than the ratio specified above, the reaction rate can be too fast to deteriorate the electrical conductivity of the conductive polymer obtained.

Also, the iron aromatic sulfonate can be provided in a liquid state of water, an aqueous solution or an organic solvent in view of the convenience in using. The concentration of the iron aromatic sulfonate in the liquid can be 30 to 70 mass %. In other words, when the concentration of the iron aromatic sulfonate is less than 30 mass %, the amount of the conductive polymer fixed on the solid electrolytic capacitor can be low. When the concentration of the iron aromatic sulfonate is more than 70 mass %, the viscosity can be too high to deteriorate the handling operation.

When a polymer sulfonic acid is used as a dopant, a persulfate can be used as an oxidant. The persulfate can be used along with aromatic sulfonic acids such as phenol sulfonic acid, cresol sulfonic acid, naphthalene sulfonic acid, naphthalene disulfonic acid, naphthalene trisulfonic acid, and anthraquinone sulfonic acid.

The chemical oxidative polymerization to prepare the conductive polymer can be used either to generally prepare a conductive polymer or to produce a solid electrolytic capacitor. In generally preparing a conductive polymer, the temperature during the chemical oxidative polymerization can be 5 to 95° C., and the polymerization duration can be 1 to 72 hours. In producing a solid electrolytic capacitor through a chemical oxidative polymerization of a conductive polymer, broad ranges of the temperature and polymerization duration can be adopted depending on the various conditions. In general, the temperature can be 0 to 300° C. and the duration can be 1 minute to 72 hours to perform the chemical oxidative polymerization.

The electrolytic oxidation polymerization can be performed either under a constant electric current or a constant voltage. For example, when the electrolytic oxidation polymerization is performed under a constant electric current, the current value can be 0.05 $mA/cm^2$ to 10 $mA/cm^2$, and in particular, it can be 0.2 $mA/cm^2$ or more so long as it is within the range specified above. When the electrolytic oxidation polymerization is performed under a constant voltage, the voltage can be 0.5V to 10V, and in particular, 1.5V or more long as it is within the range specified above. The temperature of the electrolytic oxidation polymerization can be 5 to 95° C., and in particular, 10° C. or more and 30° C. or less. The polymerization duration can be 1 to 72 hours, and in particular, 8 hours or more and 24 hours or less. Note that upon the electrolytic oxidation polymerization, ferrous sulfate or ferric sulfate can be added as a catalyst.

The conductive polymer as prepared can be obtained in a state of dispersion in water or the aqueous solution after the polymerization, including the oxidant, the iron sulfate as the catalyst or its decomposed components. Then, the water dispersion solution of the conductive polymer including the impurities can be subject to a disperser such as an ultrasonic homogenizer or a planetary ball mill in order to disperse the impurities, and then, can be subject to a cation-exchange resin to remove the metal components. At that time, the conductive polymer can be in a particle size of 100 μm or less, and in particular, 10 μm or less. Then, an ethanol precipitation method, an ultrafiltration method, or an anion-exchange resin method can be used to remove as much as the oxidant, the sulfuric acid or the like generated by decomposition of the catalyst.

The conductive polymer of the present invention has a high electrical conductivity and an excellent heat resistance, so that it can be particularly used as a solid electrolyte of a solid electrolytic capacitor such as tantalum solid electrolytic capacitor, niobium solid electrolytic capacitor, and aluminum solid electrolytic capacitor. Such a solid electrolytic capacitor can be provided with a low ESR and a large capacitance with a good reliability under a hot condition.

When the conductive polymer of the present invention is used as a solid electrolyte to produce a tantalum solid electrolytic capacitor, niobium solid electrolytic capacitor, or aluminum solid electrolytic capacitor, the following process can be used: First, the conductive polymer of the present invention is prepared as explained above, which can be made in a dispersion solution by water, an aqueous solution or an organic solvent. The dispersion solution of the conductive polymer can be provided for the production of a solid electrolytic capacitor. Alternatively, as discussed before, a conductive polymer of the present invention can be prepared for the purpose of the production of a solid electrolytic capacitor, which can be used as a solid electrolyte.

For example, when the conductive polymer of the present invention is used as a state of a dispersion liquid, first, an explanation is made in case of using the conductive polymer of the present invention as a solid electrolyte for a tantalum solid electrolytic capacitor, a niobium solid electrolytic capacitor, a lamination type aluminum solid electrolytic capacitor and so on. A capacitor element having a positive electrode of a porous material made of a valve metal such as tantalum, niobium and aluminum, and a dielectric layer of an oxidized film of the valve metal is immersed in a dispersion liquid of the conductive polymer of the present invention, and then, it is taken out and dried. These steps are repeated to form a solid electrolyte layer of the conductive polymer of the present invention. Then, a carbon paste, and silver paste are applied and dried. Then, an exterior package is provided to produce a solid electrolytic capacitor such as a tantalum solid electrolytic capacitor, niobium solid electrolytic capacitor, lamination type aluminum solid electrolytic capacitor and so on.

When a conductive polymer is prepared for the purpose of the production of the solid electrolytic capacitor and used as a solid electrolyte, the capacitor element as explained above is immersed in the liquid including the monomer mixture, and taken out, which is then immersed in a liquid including an organic sulfonic acid to become a dopant and an oxidant, and taken out to perform a polymerization. Then, it is immersed in water, and then taken out for drying, and these steps are repeated to form a solid electrolyte layer of the conductive polymer of the present invention. Thereby obtained capacitor element with the solid electrolyte layer is covered with a carbon paste and silver paste, and then, an exterior package is provided to produce a tantalum solid electrolytic capacitor, niobium solid electrolytic capacitor, lamination type aluminum solid electrolytic capacitor and so on.

Also, when the conductive polymer of the present invention is used as a solid electrolyte of a winding type aluminum solid electrolytic capacitor, the conductive polymer of the present invention is made into a dispersion liquid, which is provided for the production of such a winding type aluminum solid electrolytic capacitor. Alternatively, upon production of a winding type aluminum solid electrolytic capacitor, the conductive polymer of the present invention can be synthesized, which can be used as a solid electrolyte.

For example, when the conductive polymer of the present invention is made in a state of a dispersion liquid, first, a surface of an aluminum foil is subject to an etching treatment, and then, there are provided a positive electrode having formed a dielectric layer by a chemical conversion treatment which is attached with a lead terminal, and a negative electrode made of an aluminum foil attached with another lead terminal. These positive and negative electrodes with lead terminals are wound with a separator therebetween to produce a capacitor element. This capacitor element is immersed in a dispersion liquid of the conductive polymer of the present invention, and taken out and dried. Then, in order to remove the conductive polymer which has not entered into the small holes formed by the etching of the aluminum foil, it is immersed in pure water and taken out and dried. These steps are repeated to form a solid electrolyte layer of the conductive polymer of the present invention. Then, an exterior package is provided to produce a winding type aluminum solid electrolytic capacitor.

When the conductive polymer is prepared upon the production of a winding type aluminum solid electrolytic capacitor and used as a solid electrolyte, the capacitor element as explained above is immersed in a liquid including the monomer mixture, and then taken out. Then, a liquid including an organic sulfonic acid to become a dopant, and an oxidant is immersed, and taken out for polymerization. Then, it is immersed in water and then taken out and dried. These steps are repeated to form a solid electrolyte layer of the conductive polymer of the present invention. The capacitor element with the solid electrolyte layer is provided with an exterior package thereby to produce a winding type aluminum solid electrolytic capacitor.

At the time of the production of the solid electrolytic capacitors, after a solid electrolyte is formed by the conductive polymer of the present invention, another conductive polymer can be applied on the solid electrolyte so as to produce a solid electrolytic capacitor.

EXAMPLES

Next, the present invention is described more in detail by reference to the examples. Note that the present invention is not limited to the description of the examples. The description of the concentrations and purities, such as "%," is based on the mass standard, unless otherwise provided. Before explaining the Examples of the present invention, Synthesis Examples Nos. 1 to 4 to produce the alkylated ethylenedioxythiophenes, i.e., the propylated ethylenedioxythiophene, the ethylated ethylenedioxythiophene, the methylated ethylenedioxythiophene and butylated ethylenedioxythiophene, and Preparation Examples Nos. 1-14 of the monomer mixtures, which are used in the Examples discussed later.

Synthesis Example 1

Preparation of the propylated ethylenedioxythiophene (i.e., 2-propyl-2,3-dihydro-thieno[3,4-b][1,4]dioxin): Though the steps 1-(1) to 1-(3), the propylated ethylenedioxythiophene was synthesized.

Step 1-(1): Synthesis of pentane-1,2-diyl-bis(4-methyl benzene sulfonate)[Pentane-1,2-diyl-bis(4-methylbenzen sulfonate)]: Under ice-cooling, tosyl chloride (5.89 kg; 30 moles) and 1,2-dichloroethane (7.30 kg) were put in a reaction vessel. The mixture was stirred until the temperature inside the vessel became 10° C. Then, triethylamine (3.83 kg; 37.5 moles) were dropped therein.

While stirring the mixture above to maintain the temperature inside the vessel not to go above 40° C., 1,2-pentanediol (1.56 kg; 15 moles) were carefully dropped over a period of 60 minutes. While maintaining the temperature inside the vessel at 40° C., the mixture was stirred for 6 hours. After finishing the reaction, it was cooled at the room temperature, and then 3 kg of water is added and stirred. Then, it was kept still.

The reacted mixture was divided into a water phase and an organic phase. The organic phase was concentrated to obtain a black red oil. Under ice-cooling, 550 g of a mixture of water and methanol at a mass ratio of 1:2 were put in a reaction vessel and stirred, into which the black red oil was dropped to collect white solids as a precipitation. The white solids were washed with a small amount of methanol and dried to obtain a product, 3.77 kg of pentane-1,2-diyl-bis(4-methylbenzene sulfonate). The yield of the product was 60% based on the solid content.

Step 1-(2): Synthesis of 2-propyl-2,3-dihydro-thieno[3,4-b][1,4]dioxin-5,7-dicarboxylic acid [2-propyl-2,3-dihydrothieno[3,4-b][1,4]dioxine-5,7-dicarboxylic acid]: Into a reaction vessel, 1.18 kg (3.88 moles) of disodium-2,5-bis(alkoxycarbonyl)thiophene-3,4-diolate[disodium-2,5-bis(alkoxycarbonyl)thiophene-3,4-diolate] and 2.80 kg (6.79 moles) of pentane-1,2-diyl-bis(4-methylbenzene sulfonate) as obtained in Step 1-(1), 107 g (0.77 moles) of potassium carbonate, and 5 kg of dimethylformamide were put. The temperature inside the vessel was maintained at 120° C., and the mixture was stirred for a period of 4 hours.

The reacted mixture was concentrated to obtain brown solids as remains, into which 5 kg of a 5% aqueous solution of sodium hydrogen carbonate ($NaHCO_3$) were put and stirred at room temperature for 15 minutes to collect the brown solids.

Into a reaction vessel, the brown solids as collected and 5.32 kg of a 7% aqueous solution of sodium hydroxide were put. The temperature inside the vessel was kept at 80° C. and the mixture was stirred for 2 hours.

Until the mixture in the vessel was cooled to the room temperature, and while the temperature inside the vessel was cautioned not to go above 30° C., 1.94 kg of 98% sulfuric acid were carefully put into the reacted mixture, and the temperature inside the vessel was maintained at 80° C. and stirred for 2 hours.

The temperature inside the vessel was cooled to the room temperature to collect gray solids as a precipitation. Furthermore, the reacted mixture was cooled to collect the gray solids. The gray solids were washed with a small amount of water and dried and to obtain 727 g of 2-propyl-2,3-dihydrothieno[3,4-b][1,4]dioxin-5,7-dicarboxylic acid. The yield based on the solid content was 68%.

Step 1-(3): Synthesis of the propylated ethylenedioxythiophene: 1.12 kg (4.1 moles) of 2-propyl-2,3-dihydrothieno[3,4-b][1,4]dioxin-5,7-dicarboxylic acid as obtained in Step 1-(2) were dissolved in 1.2 kg of dimethylformamide into a reaction vessel, into which 227 g of copper oxide were added. The temperature inside the vessel was kept at 125° C., and the mixture was stirred for 5.5 hours.

Dimethylformamide was concentrated, into which 700 g of ethylene glycol were put. The mixture was distilled while the inside pressure was kept at 20 hpa and the temperature was gradually raised, so that water and initial distillation were removed out, and then, the main distillation including ethylene glycol at an amount of 900 g was generated.

Into the main distillation as obtained, 1 kg of a 10% sodium hydroxide aqueous solution were put. The temperature inside the vessel was kept at 100° C., and the mixture was stirred for 2 hours. Then, it was kept still.

The solution having two phases was divided. The lower layer, i.e., a yellow clear liquid, was the objective product, 180 g of the propylated ethylenedioxythiophene. The yield was 24%.

Synthesis Example 2

Synthesis of the ethylated ethylenedioxythiophene (i.e., 2-ethyl-2,3-dihydro-thieno[3,4-b][1,4]dioxin): Through the steps of 2-(1) to 2-(3), the ethylated ethylenedioxythiophene was produced.

Step 2-(1) Synthesis of butane-1,2-diyl-bis(4-methylbenzene sulfonate)[butane-1,2-diyl-bis(4-methylbenzen sulfonate)]: Under ice-cooling, tosyl chloride (14.25 kg; 73.28 moles) and 1,2-dichloroethane (16 kg) were put into a reaction vessel. The mixture was stirred until the temperature inside the vessel became 10° C., into which triethylamine (9.36 kg; 91.6 moles) was dropped.

While the mixture above was stirred and the temperature inside the vessel was kept not to go above 40° C., 1,2-butanediol (3.36 kg; 36.64 moles) was carefully dropped for a period of 60 minutes. The temperature inside the vessel was kept at 40° C., and the mixture was stirred for 6 hours. The reacted mixture was cooled to the room temperature, and 5 k of water was put, and the mixture was stirred. Then, the mixture was kept still.

The reacted mixture was divided into two phases: a water phase and an organic phase. The organic phase was concentrated to obtain a black red oil. Under ice-cooling, 1.25 kg of methanol were put into a reaction vessel, into which the black red oil as obtained were dropped with stirring. White solids as a precipitation were collected by filtration. The white solids were washed with a small amount of methanol, and then dried to obtain the product, 12.05 kg of butane-1,2-diyl-bis(4-methylbenzene sulfonate). The yield was 82% based on the solid content.

Step 2-(2): Synthesis of 2-ethyl-2,3-dihydro-thieno[3,4-b][1,4]dioxin-5,7-dicarboxylic acid [2-ethyl-2,3-dihydrothieno[3,4-b][1,4]dioxine-5,7-dicarboxylic acid]: Into a reaction vessel, 250 g (0.9 moles) of disodium-2,5-bis (alkoxycarbonyl)thiophene-3,4-diolate and 725 g (1.82 moles) of butane-1,2-diyl-bis(4-methylbenzene sulfonate) as obtained in Step 2-(1), 29 g (0.27 moles) of potassium carbonate, and 1 kg of dimethylacetamide were put. The temperature inside the vessel was kept at 120° C., and the mixture was stirred for a period of 4 hours.

The reacted mixture was concentrated to obtain brown solids as remains, into which 1.8 kg of a 5% solution of sodium hydrogen carbonate were put and stirred at the room temperature for 15 minutes to collect the brown solids by filtration.

Into a reaction vessel, the brown solids as collected and 1.25 kg of a 7% aqueous solution of sodium hydroxide were put. The temperature inside the vessel was maintained at 80° C., and the mixture was stirred for 2 hours.

The vessel was cooled to the room temperature. While the temperature inside the vessel was cautioned not to go above 30° C., 455 g of 98% sulfuric acid were carefully put into the reacted mixture. The temperature inside the vessel was maintained at 80° C., and the mixture was stirred for 2 hours.

The temperature inside the vessel was cooled to the room temperature to collect gray solids as a precipitation. Furthermore, the reacted mixture was cooled to collect the gray solids by filtration. The gray solids were washed with a small amount of water and dried to obtain 128 g of 2-ethyl-2,3-dihydro-thieno[3,4-b][1,4]dioxin-5,7-dicarboxylic acid. The yield was 54% based on the solid content.

Step 2-(3): Synthesis of the ethylated ethylenedioxythiophene: 500 g (1.94 moles) of 2-ethyl-2,3-dihydro-thieno [3,4-b][1,4]dioxin-5,7-dicarboxylic acid as obtained in Step 2-(2) were put in a reaction vessel to dissolve into 1 kg of dimethylformamide, into which 102 g of copper oxide were added. While the temperature inside the vessel was kept at 125° C., the mixture was stirred for 5.5 hours.

Dimethylformamide was concentrated, into which 1.7 kg of ethylene glycol were put. The inside pressure was kept at 20 hpa while the temperature was gradually raised for distillation. The initial distillation and water were removed out, and then, 1.82 kg of a main distillation including ethylene glycol were generated.

Into the main distillation as obtained, 1 kg of a 10% sodium hydroxide aqueous solution were added. While the temperature inside the vessel was kept at 100° C., the mixture was stirred for 2 hours. Then, it was kept still. The solution with two layers was divided. The lower layer was a yellow clear liquid, that was the objective product, 130 g of the ethylated ethylenedioxythiophene. The yield was 39%.

Synthesis Example 3

Synthesis of the methylated ethylenedioxythiophene (i.e., 2-methyl-2,3-dihydro-thieno[3,4-b][1,4]dioxin): Through the steps 3-(1) to 3-(3), the methylated ethylenedioxythiophene was produced.

Step 3-(1): Synthesis of propane-1,2-diyl-bis(4-methylbenzene sulfonate)[propane-1,2-diyl-bis(4-methylbenzen sulfonate)]: Under ice-cooling, 7.86 kg (40 moles) of tosyl chloride and 7 kg of 1,2-dichloroethane were put into a reaction vessel. The mixture was stirred until the temperature inside the vessel became 10° C., into which triethyl amine (5.11 kg; 50 moles) was dropped.

While the mixture was stirred and kept the temperature not to go above 40° C., 1,2-propanediol (1.55 kg; 20 moles) was carefully dropped for a period of 60 minutes. The temperature inside the vessel was kept at 40° C., and the mixture was stirred for 6 hours.

The reacted mixture was cooled at the room temperature, and then, 4 kg of water was added. The mixture was stirred, and then, it was kept still. The reacted mixture was divided into two phases: a water phase and an organic phase. The organic phase was concentrated to obtain a black red oil.

Under ice-cooling, 500 g of methanol were put into a reaction vessel, into which the black red oil as obtained above was dropped to generate a precipitation of white solids which were collected by filtration. The white solids were washed with a small amount of methanol, and dried to obtain the product, 3.87 kg of propane-1,2-diyl-bis(4-methylbenzene sulfonate). The yield was 50% based on the solid content.

Step 3-(2): Synthesis of 2-methyl-2,3-dihydro-thieno[3,4-b][1,4]dioxin-5,7-dicarboxylic acid [2-methyl-2,3-dihydrothieno[3,4-b][1,4]dioxine-5,7-dicarboxylic acid]: Into a reaction vessel, disodium-2,5-bis(alkoxycarbonyl) thiophene-3,4-diolate (508 g; 1.67 moles), propane-1,2-diyl-bis(4-methylbenzene sulfonate) (960 g; 2.5 moles) as obtained in Step 3-(1), potassium carbonate (46 g; 0.33 moles) and dimethylformamide (2.5 kg) were put. The temperature inside the vessel was kept at 120° C. while stirring the mixture for four hours.

The reacted mixture was concentrated to obtain brown solids as remaining, into which a 5% sodium hydrogen carbonate aqueous solution (3.7 kg) was put. The mixture was stirred at room temperature for 15 minutes, and the brown solids were collected by filtration. Into a reaction vessel, thereby collected brown solids and a 7% sodium hydroxide aqueous solution (2.47 kg) were put. The temperature inside the vessel was kept at 80° C., and the mixture was stirred for 2 hours.

The mixture in the vessel was cooled at the room temperature. While the temperature inside the vessel did not go above 30° C., 98% sulfuric acid (759 g) was carefully dropped into the reacted mixture. The temperature inside the vessel was kept at 80° C., and the mixture was stirred for 2 hours.

The temperature inside the vessel was cooled at the room temperature with stirring. Gray solids as a precipitation were collected by filtration. Further, the reacted mixture was cooled to collect the gray solids by filtration. When the gray solids were washed with a small amount of water and then dried, a product, 2-methyl-2,3-dihydro-thieno[3,4-b][1,4]dioxin-5,7-dicarboxylic acid (310 g) was obtained. The yield based on the solid content was 76%.

Step 3-(3): Synthesis of the methylated ethylenedioxythiophene(2-methyl-2,3-dihydro-thieno[3,4-b][1,4]dioxin): 2-methyl-2,3-dihydro-thieno[3,4-b][1,4]dioxin-5,7-dicarboxylic acid (880 g; 3.6 moles) as obtained in Step 3-(2) was put into a reaction vessel to dissolve in 3 kg of polyethylene glycol 300 (manufactured by Hayashi Pure Chemical IND., LTD.), into which copper oxide (176 g) was added. The mixture was distilled at an inside pressure of 20 hpa while the temperature was gradually raised, such that water and an initial distillation were removed out. Into a main distillation including polyethylene glycol 300, water (400 g) was added. The mixture was stirred, and then it was kept still.

The solution was divided into two layers, and the lower layer was yellow clear liquid, that was the product, the methylated ethylenedioxythiophene (343 g). The yield was 60%.

Synthesis Example 4

Synthesis of the butylated ethylenedioxythiophene (i.e., 2-butyl-2,3-dihydro-thieno[3,4-b][1,4]dioxin): Through Steps 4-(1) to 4-(3), the butylated ethylenedioxythiophene was produced.

Step 4-(1): Synthesis of hexane-1,2-diyl-bis(4-methylbenzene sulfonate) [hexane-1,2-diyl-bis(4-methylbenzen sulfonate)]: Under ice-cooling, into a reaction vessel, tosyl chloride (5.89 kg; 30 moles) and 1,2-dichloroethane (7.3 kg) were put. The mixture was stirred until the temperature inside the vessel became 10° C., into which triethylamine (3.83 kg; 37.5 moles) was dropped.

While the mixture was stirred and the temperature did not go above 40° C., 1,2-hexanediol (1.77 kg; 15 moles) was carefully dropped over a period of 60 minutes. The temperature inside the vessel was kept at 40° C. and the mixture was stirred for 6 hours.

The reacted mixture was cooled at the room temperature, into which water (3 kg) was added with stirring. Then, the mixture was kept still. Then, the reacted mixture was divided into a water phase and an organic phase. The organic phase was concentrated to obtain a black read oil.

Under ice-cooling, into a reaction vessel, 550 g of a mixture of water and methanol at a mass ratio of 1:2 were put, into which the black red oil was dropped to generate white solids as a precipitation which were collected by filtration. The white solids were washed with a small amount of methanol, and dried to obtain a product, hexane-1,2-diyl-bis(4-methylbenzene sulfonate) (3.52 kg). The yield based on the solid content was 55%.

Step 4-(2): Synthesis of 2-butyl-2,3-dihydro-thieno[3,4-b][1,4]dioxin-5,7-dicarboxylic acid [2-butyl-2,3-dihydrothieno[3,4-b][1,4]dioxine-5,7-dicarboxylic acid]: Into a reaction vessel, disodium-2,5-bis(alkoxycarbonyl)thiophene-3,4-diolate (1.18 kg; 3.88 moles), hexane-1,2-diyl-bis(4-methylbenzene sulfonate) (2.9 kg; 6.79 moles) as obtained in Step 4-(1), potassium carbonate (107 g; 0.77 moles) and dimethylformamide (5 kg) were put. The temperature inside the vessel was kept at 120° C. while the mixture was stirred for 4 hours.

The reacted mixture was concentrated to obtain brown solids as remaining, into which a 5% sodium hydrogen carbonate aqueous solution (5 kg) was put The mixture was stirred at the room temperature for 15 minutes, and the brown solids were filtered out. Into a reaction vessel, the brown solids as filtered and a 7% sodium hydroxide aqueous solution (5.32 kg) were put. The temperature inside the vessel was kept at 80° C. and the mixture was stirred for 2 hours.

Until the temperature inside the vessel was cooled at the room temperature. While the temperature inside the vessel did not go above 30° C., 98% sulfuric acid (759 g) was carefully dropped into the reacted mixture. The temperature inside the vessel was kept at 80° C., and the mixture was stirred for 2 hours.

The temperature inside the vessel was cooled at the room temperature with stirring. Gray solids as a precipitation were collected by filtration. Furthermore, the reacted mixture was cooled to filter the gray solids. After the gray solids were washed with a small amount of water and then dried, a product, 2-butyl-2,3-dihydro-thieno[3,4-b][1,4]dioxin-5,7-dicarboxylic acid (689 g) was obtained. The yield based on the solid content was 62%.

Step 4-(3): Synthesis of the butylated ethylenedioxythiophene: 2-butyl-2,3-dihydro-thieno[3,4-b][1,4]dioxin-5,7-dicarboxylic acid (1.18 kg; 4.11 moles) as obtained in Step 4-(2) was put into a reaction vessel to dissolve in 1.2 kg of dimethylformamide, into which copper oxide (227 g) was added. The temperature inside the vessel was kept at 125° C., and the mixture was stirred for 5.5 hours.

Next, the dimethylformamide was concentrated, and ethylene glycol (700 g) was added. The reaction mixture was gradually raised at an inside pressure of 20 hpa to perform distillation, such that water and an initial distillation was removed. Then, 900 g of a main distillation including ethylene glycol were generated.

Into the main distillation as obtained, a 10% sodium hydroxide aqueous solution was added. The temperature inside the vessel was kept at 100° C., and the mixture was stirred for 2 hours, and kept still.

The solution was divided into two layers. The lower layer was a yellow clear liquid, that was a product, the butylated ethylenedioxythiophene (130 g). The yield was 16%.

Preparation Example 1

The propylated ethylenedioxythiophene (i.e., 2-propyl-2,3-dihydro-thieno[3,4-b][1,4]dioxin) as obtained in Synthesis Example 1 and ethylenedioxythiophene (i.e., 2,3-dihydro-thieno[3,4-b][1,4]dioxin) were mixed together at a molar ratio of 0.3:1 to provide a monomer mixture.

Preparation Example 2

The propylated ethylenedioxythiophene as obtained in Synthesis Example 1 and ethylenedioxythiophene were mixed together at a molar ratio of 1:1 to provide a monomer mixture.

Preparation Example 3

The propylated ethylenedioxythiophene as obtained in Synthesis Example 1 and ethylenedioxythiophene were mixed together at a molar ratio of 1:0.3 to provide a monomer mixture.

Preparation Example 4

The ethylated ethylenedioxythiophene (i.e., 2-ethyl-2,3-dihydro-thieno[3,4-b][1,4]dioxin) as obtained in Synthesis Example 2 and ethylenedioxythiophene were mixed together at a molar ratio of 0.3:1 to provide a monomer mixture.

Preparation Example 5

The ethylated ethylenedioxythiophene as obtained in Synthesis Example 2 and ethylenedioxythiophene were mixed at a molar ratio of 1:1 to provide a monomer mixture.

Preparation Example 6

The ethylated ethylenedioxythiophene as obtained in Synthesis Example 2 and ethylenedioxythiophene were mixed together at a molar ratio of 1:0.3 to provide a monomer mixture.

Preparation Example 7

The propylated ethylenedioxythiophene as obtained in Synthesis Example 1, the ethylated ethylenedioxythiophene as obtained in Synthesis Example 2 and ethylenedioxythiophene were mixed together at a molar ratio of 0.5:0.5:1 to provide a monomer mixture.

Preparation Example 8

The methylated ethylenedioxythiophene as obtained in Synthesis Example 3 and ethylenedioxythiophene were mixed together at a molar ratio of 0.3:1 to provide a monomer mixture.

Preparation Example 9

The methylated ethylenedioxythiophene (i.e., 2-methyl-2, 3-dihydro-thieno[3,4-b][1,4]dioxin) as obtained in Synthesis Example 3 and ethylenedioxythiophene were mixed together at a molar ratio of 1:1 to provide a monomer mixture.

Preparation Example 10

The methylated ethylenedioxythiophene as obtained in Synthesis Example 3 and ethylenedioxythiophene were mixed together at a molar ratio of 1:0.3 to provide a monomer mixture.

Preparation Example 11

The butylated ethylenedioxythiophene (i.e., 2-butyl-2,3-dihydro-thieno[3,4-b][1,4]dioxin) as obtained in Synthesis Example 4 and ethylenedioxythiophene were mixed together at a molar ratio of 1:1 to provide a monomer mixture.

Preparation Example 12

The butylated ethylenedioxythiophene as obtained in Synthesis Example 4 and ethylenedioxythiophene were mixed together at a molar ratio of 0.1:1 to provide a monomer mixture.

Preparation Example 13

The butylated ethylenedioxythiophene as obtained in Synthesis Example 4, the propylated ethylenedioxythiophene as obtained in Synthesis Example 1, and ethylenedioxythiophene were mixed together at a molar ratio of 0.05:0.05:1 to provide a monomer mixture.

Preparation Example 14

The ethylated ethylenedioxythiophene as obtained in Synthesis Example 2 and ethylenedioxythiophene were mixed together at a molar ratio of 1:0.1 to provide a monomer mixture.

Examples 1 to 10 and Comparative Examples 1 to 4

In Examples 1 to 10 and Comparative Examples 1 to 4, conductive polymers were synthesized (produced) and their properties were evaluated.

As an oxidant and dopant agent, a 40% para-toluenesulfonic acid iron n-butanol solution (manufactured by Tayca Corporation; The para-toluenesulfonic acid iron and the para-toluenesulfonic acid were at a molar ratio of 2.8:1) was used. Into 60 μl of each of the monomer mixtures of Preparation Examples 1 to 10, ethylenedioxythiophene, and alkylated ethylenedioxythiophene of Synthesis Examples 1 to 3 (i.e., Synthesis Example 1 produced the propylated ethylenedioxythiophene; Synthesis Example 2 produced the ethylated ethylenedioxythiophene, and Synthesis Example 3 produced the methylated ethylenedioxythiophene), the 40% para-toluenesulfonic acid iron n-butanol solution (500 μl) was added. The mixture was fully stirred to initiate a chemical oxidative polymerization of the monomers. Immediately thereafter, it was dropped on a 3 cm×5 cm ceramics plate at an amount of 18 μl. Then, at a relative humidity of 60% and a temperature of 25° C., the polymerization was performed for 3 hours, and the ceramics plate was immersed in water to wash, and dried at 150° C. for 24 hours so as to provide a sheet of a conductive polymer including para-toluenesulfonic acid as a dopant on the ceramics plate.

Next, on the sheet of the conductive polymer formed on the ceramics plate, a load of 1.5 ton was applied and kept still for 5 minutes to apply the pressure evenly. Then, the electric conductivity of the conductive polymer was measured by using a four probe method measuring instrument (Manufactured by Mitsubishi Chemical Corporation; MCP-T600). The results are shown in Table 1.

Also, after the electric conductivity is measured, the conductive polymer sheets of Examples 1 to 10 and Comparative Examples 1 to 4 were put in a constant temperature bath at 150° C. to keep them still for storage. After 48 hours, the electric conductivity was measured to calculate the retention rate of the electric conductivity. The results are shown in Table 1. Table 1 describes the monomers for synthesizing the conductive polymers, but for the simplification and space purposes, the kinds were identified by using the Preparation Example Numbers in Examples 1 to 10 and the Synthesis Example numbers in Comparative Examples 2 to 4. In Comparative Example 1, the monomer, ethylenedioxythiophene is identified by "EDOT" since there was no Preparation Example number or the Synthesis Example number.

The retention rate of the electric conductivity was calculated by dividing the post electric conductivity by the initial electric conductivity (i.e., the electric conductivity measured before the storage in the temperature constant bath at 150° C.) to indicate by the percentage (%). The formula of such a calculated in shown by the formula (1) below. The higher the retention rate is, the lower the deterioration of the electric conductivity occurs due to the heat generates and therefore, and therefore, the more excellent the heat resistance is.

Retention rate of the electric conductivity=(post electric conductivity)/(initial electric conductivity)× 100.  Formula (1)

TABLE 1

|  | Monomer | Electric Conductivity (S/cm) | Retention Rate (%) |
| --- | --- | --- | --- |
| Example 1 | Preparation Example 1 | 180 | 75 |
| Example 2 | Preparation Example 2 | 186 | 74 |
| Example 3 | Preparation Example 3 | 183 | 70 |
| Example 4 | Preparation Example 4 | 190 | 79 |
| Example 5 | Preparation Example 5 | 192 | 78 |
| Example 6 | Preparation Example 6 | 194 | 72 |
| Example 7 | Preparation Example 7 | 190 | 78 |
| Example 8 | Preparation Example 8 | 159 | 64 |
| Example 9 | Preparation Example 9 | 161 | 69 |
| Example 10 | Preparation Example 10 | 158 | 65 |
| Comparative Example 1 | EDOT | 102 | 75 |
| Comparative Example 2 | Synthesis Example 1 | 182 | 32 |
| Comparative Example 3 | Synthesis Example 2 | 189 | 37 |
| Comparative Example 4 | Synthesis Example 3 | 155 | 45 |

As shown in Table 1, the conductive polymer of Examples 1 to 10 had higher electric conductivities (i.e., higher electrical conductive) than the conductive polymer of Comparative Example 1; and higher electric conductivity retention rates (i.e., more excellent heat resistance) than the conductive polymer of Comparative Examples 2 to 4. In other words, the conductive polymer of Examples 1 to 10, synthesized by using as monomers a mixture of the alkylated ethylenedioxythiophene (i.e., 2-alkyl-2,3-dihydro-thieno[3,4-b][1,4]dioxin) of Preparation Examples 1 to 10 and ethylenedioxythiophene (i.e., 2,3-dihydro-thieno[3,4-b][1,4]dioxin), had higher electric conductivities (i.e., higher electrical conductive) than the conductive polymer of Comparative Example 1 in which a monomer, EDOT (ethylenedioxythiophene) alone was used; and higher electric conductivity retention rates (i.e., more excellent heat resistance) than the conductive polymer of Comparative Examples 2 to 4 in which a single monomer of the alkylated ethylenedioxythiophene as obtained in Synthesis Examples 1 to 3 was used.

In particular, the conductive polymers from the monomer mixtures of Preparation Examples 1 to 7, i.e., where the mixture of the propylated ethylenedioxythiophene and ethylenedioxythiophene (Preparation Examples 1 to 3), the mixture of the ethylated ethylenedioxythiophene and ethylenedioxythiophene (Preparation Examples 4 to 6) and the three components mixture of the propylated ethylenedioxythiophene, the ethylated ethylenedioxythiophene and ethylenedioxythiophene (Preparation Example 7) were used to prepare the conductive polymers of Examples 1 to 7, had a high electric conductivity equivalent to those prepared from single monomer of the propylated ethylenedioxythiophene (Comparative Example 2), or the ethylated ethylenedioxythiophene (Comparative Example 3); and an excellent electric conductivity retention rate equivalent to those from single monomer of ethylenedioxythiophene (Comparative Example 1) such that the high electric conductivity properties derived from the the propylated ethylenedioxythiophene and the ethylated ethylenedioxythiophene were maintained while maintaining the excellent heat resistance properties derived from the ethylenedioxythiophene.

Examples 11 to 20 and Comparative Examples 5 to 8

In Examples 11 to 20 and Comparative Examples 5 to 8, tantalum solid electrolytic capacitors were produced to evaluate the properties of the tantalum solid electrolytic capacitors.

A tantalum sintered body was immersed in a 0.1% phosphoric acid aqueous solution while the tantalum sintered body was applied to a 20V voltage to perform a chemical conversion treatment so as to form an oxidized film of a dielectric layer on the tantalum sintered body to obtain a capacitor element. Then, each of the monomer mixtures of Preparation Examples 1 to 10, ethylenedioxythiophene and the alkylated ethylenedioxythiophene of Synthesis Examples 1 to 3 were diluted with ethanol to adjust the concentration into a 25 v/v % solution, into which the capacitor element was immersed for one minutes and taken out to keep it still for 5 minutes.

Then, it was immersed in a 40% para-toluenesulfonic acid iron ethanol solution (the para-toluenesulfonic acid serves as an oxidant and dopant agent; the para-toluenesulfonic acid iron included para-toluenesulfonic acid and iron at a molar ratio of 2.8:1), provided in advance. After 30 seconds, it was taken out and kept it at room temperature to perform a polymerization reaction. Then, the capacitor element having formed the conductive polymer layer as explained was immersed in water, and after 30 minutes, it was taken out to dry it at 70° C. for 30 minutes. These steps were repeated 15 times, and then, with a carbon paste and a silver paste, the solid electrolyte layer made of the conductive polymer was covered. An exterior package was provided to provide a tantalum solid electrolytic capacitor.

The tantalum solid electrolytic capacitors of Examples 10 to 20 and Comparative Examples 5 to 8 were measured to value their ESR and capacitance. The results are shown in Table 2. The measurements of ESR and capacitance are described below. The ESR was measured by using LCR Meter (4284A) manufactured by HEWLETT PACKARD under the condition of 25° C. and 100 kHz. The capacitance was measured by using LCR Meter (4284A) manufactured by HEWLETT PACKARD under the condition 25° C. and 120 Hz. These measurements were done for 10 samples for each example. The ESR value and capacitance value in Table 2 were averaged from the 10 samples while rounded-off on the number with a decimal point.

TABLE 2

|  | Monomer | ESR (mΩ) | Capacitance (μF) |
| --- | --- | --- | --- |
| Example 11 | Preparation Example 1 | 13 | 256 |
| Example 12 | Preparation Example 2 | 12 | 254 |
| Example 13 | Preparation Example 3 | 13 | 252 |
| Example 14 | Preparation Example 4 | 12 | 258 |

TABLE 2-continued

|  | Monomer | ESR (mΩ) | Capacitance (μF) |
| --- | --- | --- | --- |
| Example 15 | Preparation Example 5 | 11 | 256 |
| Example 16 | Preparation Example 6 | 12 | 253 |
| Example 17 | Preparation Example 7 | 12 | 255 |
| Example 18 | Preparation Example 8 | 13 | 257 |
| Example 19 | Preparation Example 9 | 13 | 257 |
| Example 20 | Preparation Example 10 | 13 | 257 |
| Comparative Example 5 | EDOT | 15 | 258 |
| Comparative Example 6 | Synthesis Example 1 | 18 | 246 |
| Comparative Example 7 | Synthesis Example 2 | 17 | 248 |
| Comparative Example 8 | Synthesis Example 3 | 17 | 249 |

Also, after measuring properties above, the tantalum solid electrolytic capacitors of Examples 11 to 20 and Comparative Examples 5 to 8 (The "tantalum solid electrolytic capacitor(s)" of each of Examples 11 to 20 and Comparative Examples 5 to 8 is/are hereinafter referred to as "capacitor(s)" for the purpose of simplification) were put in a temperature constant bath at 150° C. to keep them still for storage. After 100 hours, the ESR and capacitance were measured in the same was as explained before. The results are shown in Table 3.

TABLE 3

|  | Monomer | ESR (mΩ) | Capacitance (μF) |
| --- | --- | --- | --- |
| Example 11 | Preparation Example 1 | 14 | 254 |
| Example 12 | Preparation Example 2 | 13 | 252 |
| Example 13 | Preparation Example 3 | 14 | 251 |
| Example 14 | Preparation Example 4 | 13 | 256 |
| Example 15 | Preparation Example 5 | 12 | 255 |
| Example 16 | Preparation Example 6 | 13 | 252 |
| Example 17 | Preparation Example 7 | 13 | 254 |
| Example 18 | Preparation Example 8 | 14 | 256 |
| Example 19 | Preparation Example 9 | 14 | 255 |
| Example 20 | Preparation Example 10 | 14 | 255 |
| Comparative Example 5 | EDOT | 16 | 256 |
| Comparative Example 6 | Synthesis Example 1 | 35 | 242 |
| Comparative Example 7 | Synthesis Example 2 | 31 | 243 |
| Comparative Example 8 | Synthesis Example 3 | 30 | 244 |

As shown in Table 2, the capacitors of Examples 11 to 20 had a lower ESR (i.e., more excellent in the properties as a capacitor) than those of Comparative Example 5. In other words, the capacitors of Examples 11 to 20, in which a mixture of the alkylated ethylenedioxythiophene of Preparation Examples 1 to 10 and ethylenedioxythiophene was used to prepare conductive polymers as a solid electrolyte, had a lower ESR (i.e., more excellent in the properties as a capacitor) than that of Comparative Example 5 in which ethylenedioxythiophene alone was synthesized to obtain the conductive polymer as the solid electrolyte. This is based on the fact that the conductive polymer used in the solid electrolyte of the capacitor of Examples 11 to 20 had a higher electric conductivity than the conductive polymer used in the solid electrolyte of the capacitor of Comparative Example 5.

Note that the conductive polymers used as the solid electrolyte in the capacitor of Comparative Examples 6 to 8 were obtained by polymerizing the alkylated ethylenedioxythiophene of Synthesis Examples 1 to 3 alone. Compared with the conductive polymer used as the solid electrolyte in the capacitor of Comparative Example 5, they had a high electric conductivity as shown in Table 1, but the capacitors of Comparative Examples 6 to 8 had a higher ESR than the capacitor of Comparative Example 5 as shown in Table 2. This is considered due to the fact that while the production of the capacitors was made by laminating several layers of the conductive polymer to form a solid electrolyte layer, the capacitors of Comparative Examples 6 to 8 had a contact resistance between the conductive polymer layers higher than the capacitor of Comparative Example 5.

Also, while the capacitors of Examples 11 to 20 were prepared by using the solid electrolyte layer including the alkylated ethylenedioxythiophene as a monomer of the conductive polymer, they had a lower ESR than the capacitors of Comparative Examples 6 to 8. This is considered due to the fact that the capacitors of Examples 11 to 20 were prepared by using the solid electrolyte layer of the conductive polymer by including ethylenedioxythiophene as a monomer, so that the contribution by the ethylenedioxythiophene could reduce the contact resistance between the conductive polymer layers laminated to form the solid electrolyte layer.

Also, as shown in Table 3, the capacitors of Examples 11 to 20 had a lower increase after the storage under a hot temperature (i.e., more excellent in the heat resistance) than those of Comparative Examples 6 to 8.

Examples 21 to 34 and Comparative Examples 9 to 13

In Examples 21 to 34 and Comparative Examples 9 to 13, winding type aluminum solid electrolytic capacitors were produced and the properties of the winding type aluminum solid electrolytic capacitors were evaluated.

A surface of an aluminum foil was subject to an etching treatment, and then, to a chemical conversion treatment to form a positive electrode having a dielectric layer, on which a lead terminal was attached. Also, another lead terminal was attached to a negative electrode made of an aluminum foil. The positive electrode and the negative electrode with the lead terminals were wound with a separator provided therebetween to produce a capacitor element.

Next, each of the monomer mixtures of Preparation Examples 1 to 14, ethylenedioxythiophene and the alkylated ethylenedioxythiophene of Synthesis Examples 1 to 4 were diluted with ethanol to provide a solution having adjusted a concentration of 30 v/v %, into which the capacitor element was immersed and then taken out. Then, each of the capacitor element was separately immersed in a 63% para-toluenesulfonic acid iron ethanol solution (the para-toluenesulfonic acid iron included para-toluenesulfonic acid and iron at a molar ratio of 2.8:1), then taken out and heated at 60° C. for 2 hours and lastly at 180° C. for 1 hour to polymerize the monomer so as to form a solid electrolyte layer made of a conductive polymer. An exterior package was provided to produce a winding type aluminum solid electrolytic capacitor.

Thereby produced winding type aluminum solid electrolytic capacitors of Examples 21 to 34 and Comparative Examples 9 to 13 were provided to measure the ESR and capacitance in the same manner as Example 11, and the leak current to check the lead current defect generation. The results are shown in Table 4. The measurement method of the leak current and the evaluation of the leak current defect generation are described as follows:

Leak Current:
To the winding type aluminum solid electrolytic capacitor, a rated voltage at 25° C. of 16V was applied for 60 seconds, and then, a digital oscilloscope was used to measure the leak current.

Leak Current Defect Generation:
In the same manner as the leak current supra, a leak current was measured. When the leak current was 100 μA or more, it was determined as a leak current defect.

The measurements were made for 20 samples for each example. The numbers regarding the ESR and capacitance in Table 4 were obtained by averaging the 20 samples with rounding-off the numbers after the decimal point. Also, regarding the leak current defect generation in Table 4, the denominator is the total number of the capacitors that have been tested, and the numerator is the number of the capacitors that have found the leak current defect generation, which were shown as "leak current defect generation number."

Also, after measuring the properties of the winding type aluminum solid electrolytic capacitors of Examples 21 to 34 and Comparative Examples 9 to 13 as explained above, they were still stored in a constant temperature bath at 150° C. After 100 hours, the ESR and the capacitance were measured in the same manner. The results are shown in Table 5.

TABLE 5

| | Monomer | ESR (mΩ) | Capacitance (μF) | leak current defect generation number (Pieces) |
|---|---|---|---|---|
| Example 21 | Preparation Example 1 | 33 | 51 | 0/20 |
| Example 22 | Preparation Example 2 | 32 | 52 | 0/20 |
| Example 23 | Preparation Example 3 | 33 | 52 | 0/20 |
| Example 24 | Preparation Example 4 | 32 | 51 | 0/20 |
| Example 25 | Preparation Example 5 | 31 | 52 | 0/20 |
| Example 26 | Preparation Example 6 | 32 | 53 | 0/20 |
| Example 27 | Preparation Example 7 | 31 | 52 | 0/20 |
| Example 28 | Preparation Example 8 | 34 | 52 | 0/20 |
| Example 29 | Preparation Example 9 | 33 | 51 | 0/20 |
| Example 30 | Preparation Example 10 | 34 | 52 | 0/20 |
| Example 31 | Preparation Example 11 | 35 | 50 | 0/20 |
| Example 32 | Preparation Example 12 | 33 | 51 | 0/20 |
| Example 33 | Preparation Example 13 | 33 | 51 | 0/20 |
| Example 34 | Preparation Example 14 | 32 | 50 | 0/20 |
| Comparative Example 9 | EDOT | 37 | 44 | 9/20 |
| Comparative Example 10 | Synthesis Example 1 | 49 | 48 | 0/20 |
| Comparative Example 11 | Synthesis Example 2 | 47 | 49 | 0/20 |
| Comparative Example 12 | Synthesis Example 3 | 47 | 50 | 0/20 |
| Comparative Example 13 | Synthesis Example 4 | 79 | 41 | 0/20 |

TABLE 5

| | Monomer | ESR (mΩ) | Capacitance (μF) |
|---|---|---|---|
| Example 21 | Preparation Example 1 | 34 | 49 |
| Example 22 | Preparation Example 2 | 33 | 51 |
| Example 23 | Preparation Example 3 | 34 | 50 |
| Example 24 | Preparation Example 4 | 33 | 50 |
| Example 25 | Preparation Example 5 | 32 | 51 |
| Example 26 | Preparation Example 6 | 33 | 51 |
| Example 27 | Preparation Example 7 | 32 | 51 |
| Example 28 | Preparation Example 8 | 35 | 50 |
| Example 29 | Preparation Example 9 | 34 | 49 |
| Example 30 | Preparation Example 10 | 35 | 50 |
| Example 31 | Preparation Example 11 | 36 | 48 |
| Example 32 | Preparation Example 12 | 34 | 50 |
| Example 33 | Preparation Example 13 | 34 | 50 |
| Example 34 | Preparation Example 14 | 34 | 49 |
| Comparative Example 9 | EDOT | 38 | 41 |
| Comparative Example 10 | Synthesis Example 1 | 82 | 43 |
| Comparative Example 11 | Synthesis Example 2 | 77 | 44 |
| Comparative Example 12 | Synthesis Example 3 | 73 | 45 |
| Comparative Example 13 | Synthesis Example 4 | 206 | 36 |

As shown in Table 4, the winding type aluminum solid electrolytic capacitors of Examples 21 to 34 (the "winding type aluminum solid electrolytic capacitor(s)" is/are referred to as "capacitor(s)" for simplification) had a lower ESR and a larger capacitance than the capacitor of Comparative Example 9, showing that the former was more excellent than the latter in view of the properties of the capacitor. In other words, the capacitors of Examples 21 to 34, in which a mixture of the alkylated ethylenedioxythiophene and ethylenedioxythiophene of Preparation Examples 1 to 14 were used as a monomer to synthesize the conductive polymer for the solid electrolyte, had a lower ESR and a larger capacitance than the capacitor of Comparative Example 9 in which ethylenedioxythiophene was alone used as a monomer to synthesize the conductive polymer for the solid electrolyte, showing that the former was more excellent than the latter in view of the properties of the capacitor. As such, the reasons why the capacitors of Examples 21 to 34 had a lower ESR than that of Comparative Example 9 are considered because the conductive polymer of the solid electrolyte in Examples 21 to 34 had a higher electric conductivity than the conductive polymer of the solid electrolyte in Comparative Example 9. Also, the reasons why the capacitors of Examples 21 to 34 had a larger capacitance than that of Comparative Example 9 are considered because the conductive polymer of the solid electrolyte of the capacitor Examples 21 to 34 was synthesized from the monomer mixture including the alkylated ethylenedioxythiophene, and at the time of the polymerization, the alkylated ethylenedioxythiophene delayed the polymerization reaction to fully entering the inside of the etching holes on the aluminum foil. Also, in case of the capacitor of Comparative Example 9 in which ethylenedioxythiophene was alone used as a monomer to synthesize the conductive polymer for the solid electrolyte, there was found a leak current defect, but the capacitors of Examples 21 to 34 did not show such a leak current defect generation.

As shown in Table 5, the capacitors of Examples 21 to 34 had a less increase of the ESR after hot temperature storage than the capacitors of Comparative Examples 10 to 13, showing that the former was excellent in the heat resistance than the latter. In other words, the capacitors of Examples 21 to 34 had a less increase of the ESR after hot temperature storage than the capacitors of Comparative Examples 10 to 13 in which the alkylated ethylenedioxythiophene of Synthesis Examples 1 to 4 were alone used as a monomer to produce the conductive polymer for the solid electrolyte, showing that the former was excellent in the heat resistance than the latter.

Among the capacitors of Examples 21 to 34 and Comparative Examples 9 to 13, the capacitors of Examples 22, 24, 27, 29, 31 and 34 and Comparative Example 9 were tested with respect to the break voltage, whose results are shown in Table 6. The break voltage test were performed such that a voltage of 1 V/sec was applied to each capacitor, and when the electric current went over 0.5 A, the number at that time was read out to treat it as the break voltage. The results are shown in Table 6. Five samples of each capacitor were tested, and the average of the five samples was calculated with rounding off the number after the decimal point.

TABLE 6

| | Monomer | break voltage (V) |
|---|---|---|
| Example 22 | Preparation Example 2 | 32 |
| Example 24 | Preparation Example 4 | 33 |
| Example 27 | Preparation Example 7 | 33 |
| Example 29 | Preparation Example 9 | 33 |
| Example 31 | Preparation Example 11 | 33 |
| Example 34 | Preparation Example 14 | 38 |

TABLE 6-continued

| | Monomer | break voltage (V) |
|---|---|---|
| Comparative Example 9 | EDOT | 26 |

As shown in Table 6, the capacitors of Examples 22, 24, 27, 29, 31 and 34 had a higher break voltage than that of Comparative Example 9, showing that the former is more resistant to a high voltage than the latter.

Example 35

In Examples 11 to 20 as explained before, an iron aromatic sulfonate type agent, i.e., para-toluenesulfonic acid iron, was used as an oxidant and dopant agent to produce the tantalum solid electrolytic capacitors and evaluate the properties. In Example 35 and Examples 36 to 39 as discussed later, ammonium persulfate as a persulfate type oxidant was used to produce a tantalum solid electrolytic capacitor to evaluate the properties.

A tantalum sintered body was immersed in a 0.1% phosphoric acid aqueous solution while the tantalum sintered body was applied to a 20V voltage to perform a chemical conversion treatment so as to provide an oxidized film of a dielectric layer on the capacitor element. Then, the monomer mixture of Preparation Example 1 was diluted with ethanol to have a concentration of 35 v/v %, into which the capacitor element was immersed for 1 minute, and then taken out to keep it still for 5 minutes.

Then, a 60% 2-methylimidazole phenolsulfonate aqueous solution (pH 5), a 40% ammonium persulfate aqueous solution, and a 20% dodecyl amine oxide aqueous solution were prepared in advance and mixed at a mass ratio of 200:200:1 to provide an oxidant and dopant agent solution (the dopant was phenolsulfonic acid) made of a mixture including an emulsifier (dodecylamine oxide), into which the capacitor element was immersed for 30 seconds, and taken out to keep it for 10 minutes at room temperature. Then, it was heated at 70° C. for 10 minutes for polymerization. Then, the capacitor element having formed the conductive polymer layer was immersed in pure water for 30 minutes, taken out and dried at 70° C. for 30 minutes. These steps were repeated 12 times. Then, it was dried at 150° C. for 1 hour. Then, with a carbon paste and a silver paste, the conductive polymer as the solid electrolyte layer was covered. An exterior package was provided to produce a tantalum solid electrolytic capacitor.

Example 36

Instead of the monomer mixture of Preparation Example 1, the monomer mixture of Preparation Example 5 was used. Other than that, the same procedures as Example 35 were performed to produce a tantalum solid electrolytic capacitor.

Example 37

Instead of the monomer mixture of Preparation Example 1, the monomer mixture of Preparation Example 7 was used. Other than that, the same procedures as Example 35 were performed to produce a tantalum solid electrolytic capacitor.

Example 38

Instead of the monomer mixture of Preparation Example 1, the monomer mixture of Preparation Example 9 was used. Other than that, the same procedures as Example 35 were performed to produce a tantalum solid electrolytic capacitor.

Example 39

Instead of the 60% 2-methylimidazole phenolsulfonate aqueous solution (pH 5), a 60% 1,3,6-naphthalenetrisulfonic acid 2-methylimidazole aqueous solution (pH 5) was used. Other than that, the same procedures as Example 35 were performed to produce a tantalum solid electrolytic capacitor.

Comparative Example 14

Instead of the monomer mixture of Preparation Example 1, ethylenedioxythiophene was used as a monomer. Other than that, the same procedures as Example 35 were performed to produce a tantalum solid electrolytic capacitor.

Comparative Example 15

Instead of the monomer mixture of Preparation Example 1, the propylated ethylenedioxythiophene of Synthesis Example 1 was used as a monomer. Other than that, the same procedures as Example 35 were performed to produce a tantalum solid electrolytic capacitor.

Comparative Example 16

Instead of the monomer mixture of Preparation Example 1, the ethylated ethylenedioxythiophene of Synthesis Example 2 was used as a monomer. Other than that, the same procedures as Example 35 were performed to produce a tantalum solid electrolytic capacitor.

Comparative Example 17

Instead of the monomer mixture of Preparation Example 1, the methylated ethylenedioxythiophene of Synthesis Example 3 was used. Other than that, the same procedures as Example 35 were performed to produce a tantalum solid electrolytic capacitor.

Comparative Example 18

Instead of using the 60% 2-methylimidazole phenolsulfonate aqueous solution (pH 5), a 60% 1,3,6-naphthalenetrisulfonic acid 2-methylimidazole aqueous solution (pH 5) was used. Other than that, the same procedures as Comparative Example 14 were performed to produce a tantalum solid electrolytic capacitor.

Comparative Example 19

Instead of using the 60% 2-methylimidazole phenolsulfonate aqueous solution (pH 5), a 60% 1,3,6-naphthalenetrisulfonic acid 2-methylimidazole aqueous solution (pH 5) was used. Other than that, the same procedures as Comparative Example 16 were performed to produce a tantalum solid electrolytic capacitor.

As to the tantalum solid electrolytic capacitors of Examples 35 to 39 and Comparative Examples 14 to 19, the ESR and the capacitance were measured in the same manner as Example 11. The results are shown in Table 7. The measurement was made such that 20 samples of each example were tested, and the numbers of the ESR and the capacitance in Table 7 were obtained by averaging the 20 samples with rounding off the number after the decimal point.

After measuring the ESR and the capacitance, the tantalum solid electrolytic capacitors of Examples 35 to 39 and Comparative Examples 14 to 19 were still placed in a constant temperature bath at 150° C. for storage for 100 hours. Then, the ESR and the capacitance were measured in the same manner as explained before. The results are shown in Table 8.

TABLE 7

|  | Monomer | ESR (mΩ) | Capacitance (μF) |
|---|---|---|---|
| Example 35 | Preparation Example 1 | 13 | 252 |
| Example 36 | Preparation Example 5 | 12 | 253 |
| Example 37 | Preparation Example 7 | 12 | 253 |
| Example 38 | Preparation Example 9 | 13 | 254 |
| Example 39 | Preparation Example 1 | 12 | 253 |
| Comparative Example 14 | EDOT | 21 | 241 |
| Comparative Example 15 | Synthesis Example 1 | 20 | 243 |
| Comparative Example 16 | Synthesis Example 2 | 20 | 246 |
| Comparative Example 17 | Synthesis Example 3 | 16 | 253 |
| Comparative Example 18 | EDOT | 35 | 50 |
| Comparative Example 19 | Synthesis Example 2 | 33 | 51 |

TABLE 8

|  | Monomer | ESR (mΩ) | Capacitance (μF) |
|---|---|---|---|
| Example 35 | Preparation Example 1 | 14 | 251 |
| Example 36 | Preparation Example 5 | 13 | 252 |
| Example 37 | Preparation Example 7 | 13 | 252 |
| Example 38 | Preparation Example 9 | 14 | 253 |
| Example 39 | Preparation Example 1 | 13 | 252 |
| Comparative Example 14 | EDOT | 17 | 251 |
| Comparative Example 15 | Synthesis Example 1 | 51 | 239 |
| Comparative Example 16 | Synthesis Example 2 | 48 | 240 |
| Comparative Example 17 | Synthesis Example 3 | 45 | 243 |
| Comparative Example 18 | EDOT | 18 | 252 |
| Comparative Example 19 | Synthesis Example 2 | 61 | 235 |

As shown in Table 7, the tantalum solid electrolytic capacitors of Examples 35 to 39 in which a mixture of the alkylated ethylenedioxythiophene of Preparation Examples 1, 5, 7 and 9 and ethylenedioxythiophene were used as a monomer to prepare the conductive polymer for the solid electrolyte (Hereinafter, the "tantalum solid electrolytic capacitor(s)" is/are referred to as "capacitor(s)" for simplification) had a lower ESR than the capacitors of Comparative Examples 14 and 18 in which ethylenedioxythiophene was alone used as a monomer to prepare the conductive polymer for the solid electrolyte. This is considered because the conductive polymer of the solid electrolyte in the capacitors of Examples 35 to 39 had a higher electric conductivity than the conductive polymer of the solid electrolyte in the capacitors of Comparative Examples 14 and 18.

As shown in Table 8, the capacitors of Examples 35 to 39 had a less increase of the ESR after the storage at a hot temperature than the capacitors of Comparative Examples 15 to 17 and 19 that were prepared from the conductive polymer for the solid electrolyte of Synthesis Examples 1 to 3 in which the alkylated ethylenedioxythiophene was alone used as a monomer. The results show that the former is excellent than the latter in the heat resistance.

Example 40

In Examples 11 to 39, the conductive polymer of the present invention alone was used as the solid electrolyte to produce the solid electrolytic capacitors. In Example 40 and Examples 41 to 43 discussed later, another conductive polymer is further formed on the solid electrolyte layer of the conductive polymer of the present invention so as to produce tantalum solid electrolytic capacitors and evaluate their properties.

First, a dispersion liquid including the conductive polymer in order to prepare the solid electrolytes of Examples 40, and 41 to 43.

As a polymer sulfonic acid to be a dopant, polyethylene styrene sulfonic acid and sulfonated polyester were used.

Next, the details of the preparation of the dispersion liquid including the conductive polymer are described. First, 600 g of a 4% aqueous solution of polystyrene sulfonic acid (manufactured by Tayca Corporation; weight-average molecular weight: 100,000) were put into a stainless steel vessel with an internal volume of 1 L, into which ferrous sulfate 7 hydrate (0.3 g) was put for dissolution, then, into which ethylenedioxythiophene (4 mL) was gradually dropped. A stainless steel stirrer was used to stir the mixture such that a positive electrode was provided on the vessel while a negative electrode was provided on the base of the stirrer. A constant electric current of 1 mA/cm$^2$ was applied for 18 hours to perform an electrolytic oxidation polymerization. After the electrolytic oxidation polymerization, water was put to dilute into a 4 time volume. Then, an ultrasonic homogenizer [manufactured by Nippon Seiki Co., Ltd.; US-T300 (Trade name)] was used for the treatment for 30 minutes. Then, a cation-exchange resin, AMBERLITE 120B (Trade name) manufactured by Organo Corporation (100 g) was put therein to stir the mixture for 1 hour. Next, a filtration treatment by a filter No. 131 manufactured by Toyo Roshi Kaisha Ltd. was made. The steps from the treatments by the cation-exchange resin and the filtration were repeated three times to completely remove the iron ions and the other cation components.

The liquid after the treatments was filtered with porous diameter of 1 μm. Thereby filtered liquid was treated with an ultrafiltration device [manufactured by SARTORIUS K.K; VIVAFLOW 200 (Trade name); molecular-weight fraction: 50,000], in order to remove low molecular weight components dispersed in the liquid. Thereby treated liquid was diluted with water to adjust the concentration into 3%. Into the 3% liquid (40 g), a high boiling point solvent, dimethylsulfoxide (4 g) was added to provide a dispersion liquid A including a conductive polymer in which polystyrene sulfonic acid was a dopant. The content of the dimethylsulfoxide was 330% with respect to the conductive polymer.

Separate from the above, 200 g of a 3% aqueous solution of a sulfonated polyester [manufactured by Goo Chemical Co., Ltd.: PLASCOAT Z-561 (Trade Name); weight-average molecular weight: 27,000] were put into a vessel with an internal volume of 1 L, into which as an oxidant, ammonium persulfate (2 g) was put and stirred with a stirrer for dissolution. Next, 0.4 g of a 40% aqueous solution of ferric sulfate was put. With stirring, ethylenedioxythiophene (3 mL) was gradually dropped over a period of 24 hours to polymerize the ethylenedioxythiophene.

After the polymerization, the mixture was diluted with water into a 4 time volume, and an ultrasonic homogenizer [manufactured by Nippon Seiki Co., Ltd.; US-T300 (Trade name)] was used for the treatment for 30 minutes. Then, a cation-exchange resin, AMBERLITE 120B (Trade name) manufactured by Organo Corporation (100 g) was put therein to stir the mixture for 1 hour. Next, a filtration treatment by a filter No. 131 manufactured by Toyo Roshi Kaisha Ltd. was made. The steps from the treatments by the cation-exchange resin and the filtration were repeated three times to completely remove the iron ions and the cation components.

The liquid after the treatments was filtered with porous diameter of 1 μm. Thereby filtered liquid was treated with an ultrafiltration device [manufactured by SARTORIUS K.K; VIVAFLOW 200 (Trade name); molecular-weight fraction: 50,000], in order to remove low molecular weight components dispersed in the liquid. Thereby treated liquid was diluted with water to adjust the concentration into 3%. Into the 3% liquid (40 g), a high boiling point solvent, dimethylsulfoxide (4 g) was added to provide a dispersion liquid B including a conductive polymer in which the sulfonated polyester was a dopant. The content of the dimethylsulfoxide was 330% with respect to the conductive polymer.

The dispersion liquid A and the dispersion liquid B were mixed at a mass ratio of 1:1 to provide a dispersion liquid including the conductive polymer.

Next, the details of the preparation of a tantalum solid electrolytic capacitor are described. A tantalum sintered body was immersed into a 0.1% phosphoric acid aqueous solution while the tantalum sintered body was applied to a 20V voltage to perform a chemical conversion treatment so as to form an oxidized film of a dielectric layer on the tantalum sintered body to provide a capacitor element. Next, the monomer mixture of Preparation Example 1 was diluted with ethanol to adjust the concentration into 35 v/v %, into which the capacitor element was immersed for 1 minute and taken out and kept if for 5 minutes.

Then, a 60% naphthalenetrisulfonic acid 2-methylimidazole aqueous solution (pH 5), a 40% ammonium persulfate aqueous solution and a 20% dodecyl amine oxide aqueous solution, that were prepared in advance, were mixed at a mass ratio of 200:200:1 to provide a mixture that is an oxidant and dopant agent solution (dopant was naphthalene sulfonic acid) including an emulsifier (dodecyl amine oxide). The capacitor element was immersed in the mixture, and after 30 seconds, it was taken out and kept still at room temperature. Then, it was heated at 70° C. for 10 minutes to conduct a polymerization. Then, the capacitor element having formed the conductive polymer layer was immersed in water and kept still for 30 minutes, and taken out and dried at 70° C. for 30 minutes. These procedures were repeated 6 times. Then, it was dried at 150° C. for one hour to prepare a solid electrolyte layer of the conductive polymer of the present invention.

Next, the capacitor element having formed the solid electrolyte layer of the conductive polymer of the present invention was immersed into a dispersion liquid including the conductive polymer in which the polymer sulfonic acid was a dopant. After 1 minute, it was taken out. A procedure of drying at 50° C. for 10 minutes and 150° C. for 10 minutes was repeated 2 times, so as to form a solid electrolyte of another conductive polymer (i.e., this particular conductive polymer is different from the conductive polymer of the invention). A carbon paste and a silver paste were used to cover the solid electrolyte layer. An exterior package was provided to produce a tantalum solid electrolytic capacitor.

Example 41

Instead of using the monomer mixture of Preparation Example 1, the monomer mixture of Preparation Example 5 was used. Other than that, the same procedures as Example 40 were used to produce a tantalum solid electrolytic capacitor.

Example 42

Instead of using the monomer mixture of Preparation Example 1, the monomer mixture of Preparation Example 7 was used. Other than that, the same procedures as Example 40 were used to produce a tantalum solid electrolytic capacitor.

Example 43

Instead of using the monomer mixture of Preparation Example 1, the monomer mixture of Preparation Example 9 was used. Other than that, the same procedures as Example 40 were used to produce a tantalum solid electrolytic capacitor.

Comparative Example 20

Instead of using the monomer mixture of Preparation Example 1, ethylenedioxythiophene was used as a monomer. Other than that, the same procedures as Example 40 were used to produce a tantalum solid electrolytic capacitor.

Comparative Example 21

Instead of using the monomer mixture of Preparation Example 1, the propylated ethylenedioxythiophene of Synthesis Example 1 was used as a monomer. Other than that, the same procedures as Example 40 were used to produce a tantalum solid electrolytic capacitor.

Comparative Example 22

Instead of using the monomer mixture of Preparation Example 1, the ethylated ethylenedioxythiophene of Synthesis Example 2 was used as a monomer. Other than that, the same procedures as Example 40 were used to produce a tantalum solid electrolytic capacitor.

Comparative Example 23

Instead of using the monomer mixture of Preparation Example 1, the methylated ethylenedioxythiophene of Synthesis Example 3 was used as a monomer. Other than that, the same procedures as Example 40 were used to produce a tantalum solid electrolytic capacitor.

The tantalum solid electrolytic capacitors of Examples 40 to 43 and Comparative Examples 20 to 23 were provided to measure the ESR and the capacitance in the same manner as Example 11. The results are shown in Table 9. Note that the measurements were made such that 20 samples of each example were tested, and the numbers of the ESR and the capacitance in Table 9 were obtained by averaging the 20 samples with rounding-off the number after the decimal point.

After the measurements of the ESR and the capacitance, the tantalum solid electrolytic capacitors of Examples 40 to 43 and Comparative Examples 20 to 23 were placed in a constant temperature bath at 150° C. After 100 hours, the ESR and the capacitance were measured in the same manner as explained above. The results are shown in Table 10.

TABLE 9

|  | Monomer | ESR (mΩ) | Capacitance (μF) |
|---|---|---|---|
| Example 40 | Preparation Example 1 | 14 | 250 |
| Example 41 | Preparation Example 5 | 13 | 250 |
| Example 42 | Preparation Example 7 | 13 | 251 |
| Example 43 | Preparation Example 9 | 15 | 249 |
| Comparative Example 20 | EDOT | 18 | 250 |
| Comparative Example 21 | Synthesis Example 1 | 29 | 238 |

TABLE 9-continued

|  | Monomer | ESR (mΩ) | Capacitance (μF) |
|---|---|---|---|
| Comparative Example 22 | Synthesis Example 2 | 27 | 240 |
| Comparative Example 23 | Synthesis Example 3 | 26 | 243 |

TABLE 10

|  | Monomer | ESR (mΩ) | Capacitance (μF) |
|---|---|---|---|
| Example 40 | Preparation Example 1 | 15 | 248 |
| Example 41 | Preparation Example 5 | 14 | 248 |
| Example 42 | Preparation Example 7 | 14 | 247 |
| Example 43 | Preparation Example 9 | 16 | 247 |
| Comparative Example 20 | EDOT | 20 | 248 |
| Comparative Example 21 | Synthesis Example 1 | 83 | 232 |
| Comparative Example 22 | Synthesis Example 2 | 84 | 235 |
| Comparative Example 23 | Synthesis Example 3 | 74 | 238 |

As shown in Table 9, the tantalum solid electrolytic capacitors of Examples 40 to 43 (Hereinafter, the "tantalum solid electrolytic capacitor(s)" is/are referred to as "capacitor(s)" for simplification) had a lower ESR than the capacitor of Comparative Example 20. The results show that the effects by using the mixture of the alkylated ethylenedioxythiophene and ethylenedioxythiophene as monomers to prepare the conductive polymer for the solid electrolyte were not deteriorated even if another conductive polymer for the solid electrolyte was additionally used to prepare a capacitor.

As shown in Table 10, the capacitors of Examples 40 to 43 had a less increase of the ESR after the storage at a hot temperature than the capacitor elements of Comparative Examples 21 to 23, showing that the former were more excellent in the heat resistance than the latter. Also in view of this, the effects of the present invention were found not to be deteriorated.

INDUSTRIAL APPLICABILITY

According to the present invention, there is provided a conductive polymer having a high electrical conductivity and an excellent heat resistance. Also, by using such a conductive polymer having a high electrical conductivity and an excellent heat resistance as a solid electrolyte, there is provided a solid electrolytic capacitor having a low ESR and a large capacitance with good reliability under a hot condition.

What is claimed is:

1. A conductive polymer wherein a monomer mixture of 2,3-dihydro-thieno[3,4-b][1,4]dioxin and 2-alkyl-2,3-dihydro-thieno[3,4-b][1,4]dioxin at a mixture ratio of 0.05:1 to 1:0.1 by the molar ratio is polymerized in the presence of an organic sulfonic acid, wherein the organic sulfonic acid is included as a dopant in the conductive polymer.

2. A conductive polymer according to claim 1, wherein the 2-alkyl-2,3-dihydro-thieno[3,4-b][1,4]dioxin is selected from the group consisting of 2-methyl-2,3-dihydro-thieno[3,4-b][1,4]dioxin, 2-ethyl-2,3-dihydro-thieno[3,4-b][1,4]dioxin, 2-propyl-2,3-dihydro-thieno[3,4-b][1,4]dioxin and 2-butyl-2,3-dihydro-thieno[3,4-b][1,4]dioxin.

3. A conductive polymer according to claim 1, wherein the polymerization is a chemical oxidation polymerization.

4. A conductive polymer according to claim 3, wherein the organic sulfonic acid is an aromatic sulfonic acid, and wherein an oxidant and dopant agent used in the chemical oxidation polymerization is an iron aromatic sulfonate.

5. A conductive polymer according to claim 4, wherein the iron aromatic sulfonate is made of an aromatic sulfonic acid and iron at a molar ratio of 2.00:1 to 2.95:1.

6. A conductive polymer according to claim 4, wherein the iron aromatic sulfonate is selected from the group consisting of para-toluenesulfonic acid iron and methoxy benzenesulfonic acid iron.

7. A conductive polymer according to claim 4, wherein the iron aromatic sulfonate is provided in a state of a liquid selected from a group consisting of water, an aqueous solution of water and a water-miscible solvent, and an organic solvent, wherein a concentration of the iron aromatic sulfonate in the liquid is 40 to 70 mass %.

8. A solid electrolyte capacitor, comprising the conductive polymer of claim 1 as a solid electrolyte.

9. A solid electrolyte capacitor, comprising:
a first conductive polymer of the conductive polymer of claim 1 as a first solid electrolyte; and
a second conductive polymer as a second solid electrolyte, provided on the first conductive polymer.

10. A solid electrolyte capacitor according to claim 9, wherein the second conductive polymer is obtained by drying a dispersion liquid including the second conductive polymer.

* * * * *